United States Patent [19]
Numata et al.

[11] Patent Number: 5,602,590
[45] Date of Patent: Feb. 11, 1997

[54] METHOD FOR RESTRICTING TOTAL CODE VOLUME IN DATA-COMPRESSION

[75] Inventors: Kohji Numata; Hiroyuki Ishikawa, both of Tokyo, Japan

[73] Assignee: NEC Corporation, Tokyo, Japan

[21] Appl. No.: 475,299

[22] Filed: Jun. 7, 1995

[30] Foreign Application Priority Data

Jul. 28, 1994 [JP] Japan .................................. 6-176363

[51] Int. Cl.⁶ ................................................ H04N 7/133
[52] U.S. Cl. .......................... 348/405; 348/405; 348/404; 348/419
[58] Field of Search ..................... 348/405, 407, 348/406, 419, 411, 415, 416, 404

[56] References Cited

U.S. PATENT DOCUMENTS

| | | | |
|---|---|---|---|
| 5,159,447 | 10/1992 | Haskell et al. | 348/419 |
| 5,241,383 | 8/1993 | Chen et al. | 348/409 |
| 5,245,427 | 9/1993 | Kunishiro | 348/405 |
| 5,402,176 | 3/1995 | Murakami et al. | 348/409 |
| 5,404,168 | 4/1995 | Yamada et al. | 348/406 |
| 5,426,463 | 6/1995 | Reininger et al. | 348/405 |

FOREIGN PATENT DOCUMENTS 4-343578  11/1992  Japan .

*Primary Examiner*—Tommy P. Chin
*Assistant Examiner*—Anand Rao
*Attorney, Agent, or Firm*—Sughrue, Mion, Zinn, Macpeak & Seas

[57] ABSTRACT

In a data-compression of a moving picture employing MPEG system, the quantization step used for quantizing coefficients of frequency components obtained in DCT (discrete cosine transform), is determined on a first frame of the moving picture, and is used for all the frames of the moving picture. A frame is processed by first run of data-compression. Code volume is allotted for each block in accordance with data obtained by the first run of data-compression, and in second run of data-compression, Huffman coding is discontinued when generated code volume of a block becomes larger than the code volume allotted to the block. When generated code volume of a frame is smaller than the target code volume of a frame, the surplus target code volume is added to a target code volume of a succeeding frame.

9 Claims, 6 Drawing Sheets

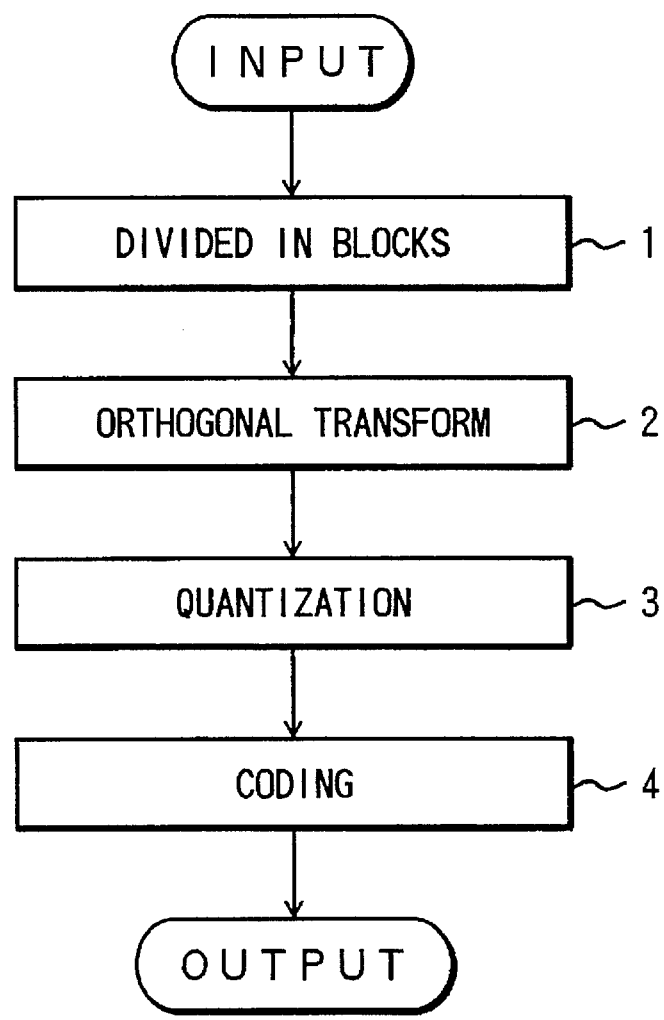

METHOD FOR RESTRICTING TOTAL CODE VOLUME IN DATA-COMPRESSION

BACKGROUND OF THE INVENTION

This invention relates to a method for restricting total code volume in data-compression.

An enormous volume of memory is necessary for storing digital data of a picture signal in a magnetic disk, or in a CD-ROM. Therefore, in order to store many frames of pictures in a limited range of memory volume, some kind of high efficient data-compression is necessary. And, in recording a moving picture in a digital VTR, or in a digital moving picture file, a predetermined number of frames must be recorded in a predetermined memory volume independent of data volume contained in each frame. And, time required for recording and reproducing of a frame of a moving picture must be short and invariable.

For these purposes, it is necessary in data-compression to keep total code volume of a frame of a moving picture within a predetermined target code volume.

As for a data-compression of high efficiency, there is MPEG system wherein two dimensional orthogonal transform and variable length coding are combined.

The MPEG system which is developed by moving picture expert group in ISO, is briefly described in connection with FIG. 7.

The input is a picture data, composed of, for example, 352×288 pixel data. In step 1, the input is divided to blocks of equal size, for example, each block being composed of 8×8 pixels. In step 2, each block is transformed through a two dimensional DCT (discrete cosine transform, and in a general term, an orthogonal transform). Coefficients of frequency components obtained by the DCT are quantized (step 3).

Quantized coefficients are stored in a memory, for example, shown by FIG. 5. The memory of FIG. 5 has 8 X-address from X0 to X7, and 8 Y-address from Y0 to Y7. The DC component (or the mean value of pixel data of the block) is stored at (X0, Y0), The fundamental frequency component in X direction is stored at (X1, Y0), and the fundamental frequency component in Y direction is stored at (X0, Y1). Thus, as shown by a zigzag line in FIG. 5, starting from a DC component at (X0, Y0), the frequency of a component whose coefficient is stored at an address becomes higher as the zigzag line advances.

In step 4 of FIG. 7, Huffman coding (in a general term, a variable length coding) is operated on data stored in the memory shown by FIG. 5. In this coding, the DC component stored at (X0, Y0) is coded by differences between DC components of neighboring blocks. AC components are scanned on the zigzag line as shown in FIG. 5, and Huffman coding is operated.

As a prior art of this invention, wherein a data-compression as MPEG system is employed for data-compression of a picture data, restricting total code volume within a target code volume, there is a Japanese patent application entitled "An apparatus for data-compression and coding of a picture" and laid open as a provisional publication No. 343578/'92.

In the apparatus of the prior art, quantization step Q is determined before data compression, total generated code volume is obtained in a first run of data-compression, and in a second run of data-compression, data coding is so discontinued in a block as to restrict total generated code volume of the block within a code volume allotted to the block.

Since the apparatus of the prior art is designed for processing a frame of a picture as a unit, when the apparatus is used for processing a moving picture including a plural number of frames, there arises a problem wherein difference between actually generated code volume and the target code volume of a frame is integrated for each frame. And, since the quantization step Q is determined for each frame in the apparatus of the prior art, when a moving picture is processed by the apparatus, there arises a problem that data-compression and data-expansion require a large amount of processing time.

SUMMARY OF THE INVENTION

Therefore, a primary object of the present invention is to supply a method for restricting total code volume in data-compression wherein the difference between actually generated code volume and the target code volume of a frame is not integrated for each frame, and the processing time of data-compression and data-expansion is relatively short.

In order to achieve the object, the quantization step Q in this invention is determined from a first frame or from several frames of a moving picture, and after the quantization step Q is determined, the following frames of the moving picture are quantized with the determined quantization step. And in code volume control of this invention, there are provided a step for adjusting surplus and deficient code volumes between different frames, a step for discontinuing coding in a unit of a block, and a step for stuffing a virtual train of bits (dummy bits for increasing code volume) in a macro-block which is composed of several succeeding blocks of a frame.

Thus, by the present invention, data-compression and data-expansion of a moving picture data can be processed in high speed, because the quantization step Q is kept constant throughout all frames of a moving picture, surplus or deficient code volume in a unit of a frame can be adjusted by the succeeding frame, and coding can be discontinued in a unit of a block or dummy bits can be stuffed in a unit of a macro-block.

BRIEF DESCRIPTION OF THE DRAWINGS

Further objects, features, and advantages of this invention will become apparent from a consideration of the following description, the appended claims, and the accompanying drawings.

FIG. 7 shows a flow chart illustrating process steps in MPEG system.

DETAILED DESCRIPTION OF THE PREFERRED EMBODIMENTS

The present invention will be described in connection with the drawings.

Figure 1:
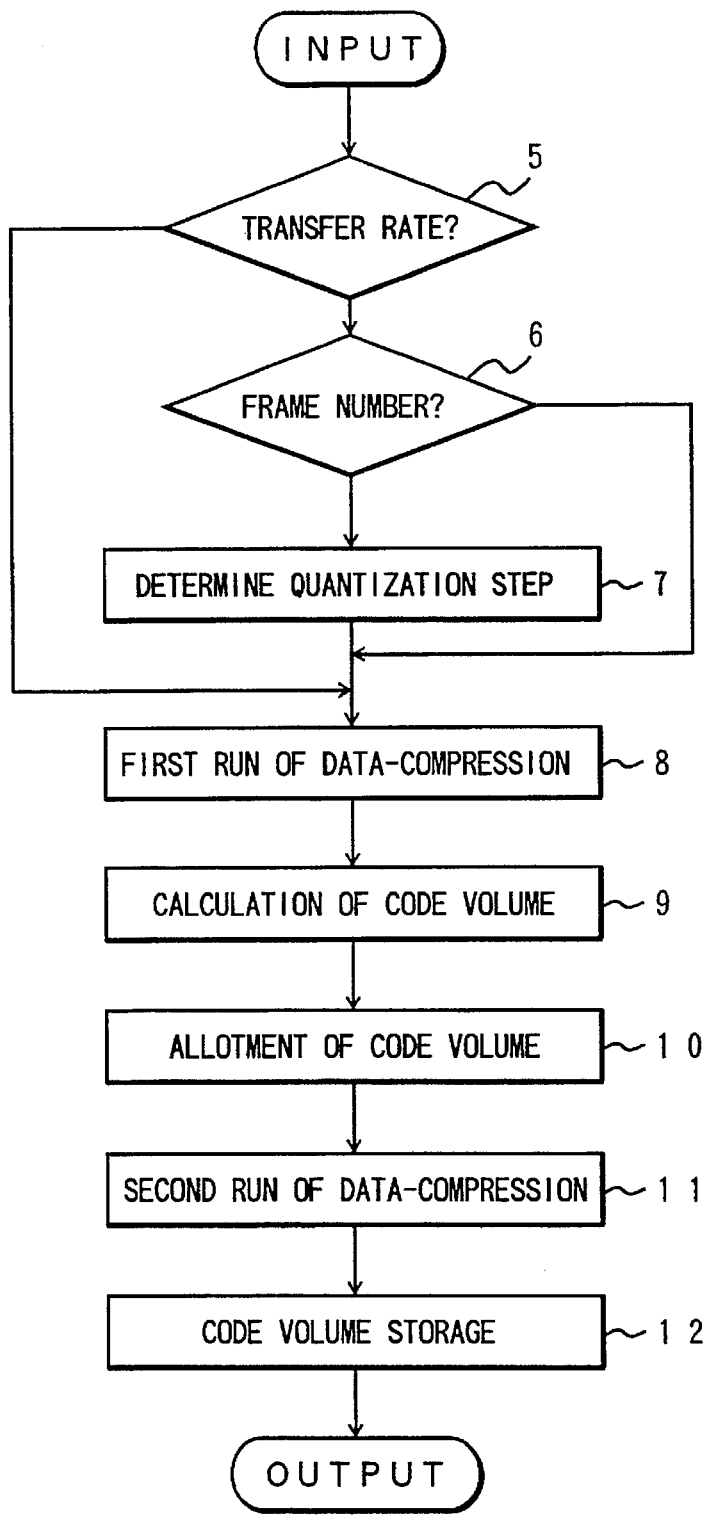
FIG. 1 shows a flow chart illustrating an embodiment of the present invention.

FIG. 1 shows a flow chart of data-compression of this invention. In FIG. 1, a flow of data-compression of a frame is shown. At step 5, it is checked from the input that whether the data transfer rate is designated or not. When the data transfer rate is not designated, the step goes directly to step 8 for the first run of data-compression wherein the quantization step designated by a user is used.

When the data transfer rate is designated, the step goes to step 6 wherein the frame number is examined of the frame. When the frame being processed is the first frame of a moving picture, the step goes to step 7 wherein the quantization step Q is determined in accordance with the designated data transfer rate. When the frame being processed is not the first frame of the moving picture, it means that the quantization step Q has already been determined at the first frame, and the step goes from the step 6 to the step 8.

The step 7 is explained in a later paragraph in connection with FIG. 2.

In the step 8 of FIG. 1, the steps 1, 2, 3, 4 of FIG. 7 are performed, and generated code volumes are calculated. In step 9 of FIG. 1, generated code volumes are recorded for each block, and total generated code volume of the frame is calculated. Since a target code volume of a frame is predetermined, allotted code volume of a block is determined by a proportionate distribution equation. When code volume generated by a block is denoted by (VGB), code volume allotted to the block is denoted by (VAB), target code volume of a frame is denoted by (VTF), and generated code volume of the frame is denoted by (VGF), the proportionate distribution equation will be $$(VAB)/(VGB)=(VTF)/(VGF) \qquad (1)$$

that is, $$(VAB)=(VGB)\times(VTF)/(VGF) \qquad (2)$$

Allotment of code volume for each block as described is operated at step 10. And in step 11, a second run of data-compression is performed, wherein generated code volume of a block is restricted within the allotted code volume for the block. In step 12, generated code volume of the frame is stored in a memory. Contents of this memory stored at the step 12 is denoted by (VPF) meaning generated code volume of the preceding frame.

In data-compression of a moving picture data composed of a plural number of frames, frames following the first frame are processed by the step 8, with the quantization step Q determined in the first frame. And, in the step 9, generated code volume of the frame is calculated. And, before entering the step 10, the target code volume (VTF) is compensated in connection with the code volume (VPF) which is stored at the step 12 by the preceding frame.

When (VPF)>(VTF), it means that a surplus of code volume (which will be denoted by (+VF))(+VF)=(VPF)−(VTF) is produced by the second run of data-compression (step 11) of the preceding frame. And, when (VPF)<(VTF), it means that a deficiency of code volume (which will be denoted by (−VF))(−VF)=(VTF)−(VPF) is produced by the second run of data-compression (step 11) of the preceding frame. In the present invention, this surplus or deficiency is compensated in a second run of data-compression (step 11) of a succeeding frame. And, in the step 10, a compensated target code volume (which is denoted by (VTC)) is used in equation (2) instead of (VTF). (VTC) is (VTF)−(+VF) or (VTF)+(−VF). In either case, $$(VTC)=2(VTF)-(VPF) \qquad (3),$$

and $$(VAB)=(VGB)\times(VTC)/(VGF) \qquad (4),$$

where (VGF) is the generated code volume of the succeeding frame calculated in the first run of data-compression (step 8).

Figure 2:
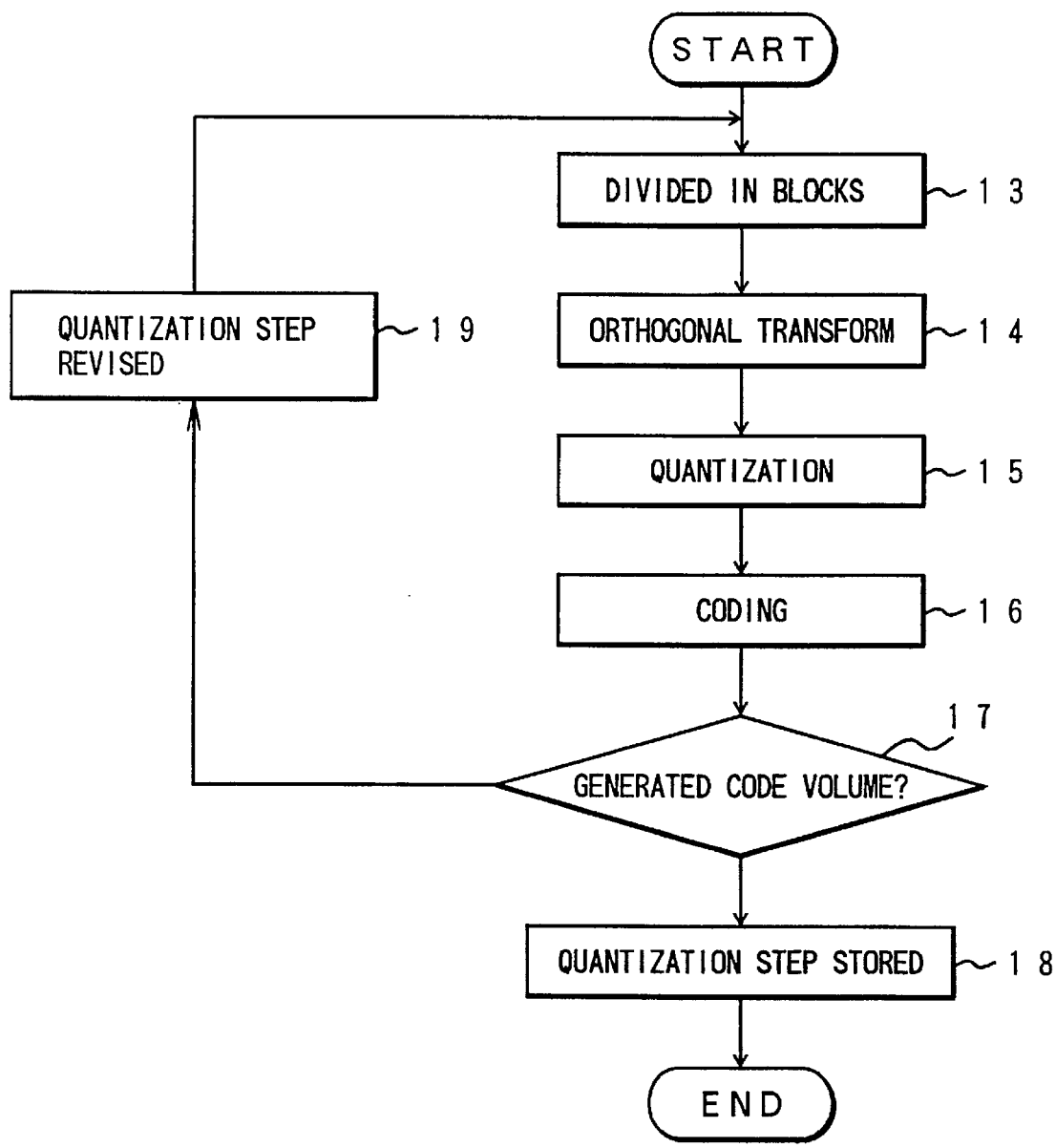
FIG. 2 shows a flow chart illustrating steps for determining quantization step in the present invention.

Now, referring to FIG. 2, the step 7 of FIG. 1 for determination of the quantization step is explained. Steps 13, 14, 15 and 16 are same with the steps 1, 2, 3 and 4 of FIG. 7, and will need no further explanation.

At an initialization, the quantization step Q in step 19 is set at a lowest usable value corresponding to a lowest ratio of data-compression. Generated code volume of a block is calculated for all the blocks of a frame to produce generated code volume of the frame. In step 17, the generated code volume of the frame is compared to the target code volume (VTF). When the generated code volume is larger than the target code volume, the quantization step Q is increased at step 19, and steps 13–17 are repeated for the increased quantization step Q. When the generated code volume is smaller than the target code volume, the quantization step Q is decreased and steps 13–17 are repeated for the decreased quantization step. Repeating the steps 13–17 and 19 in this way, the generated code volume becomes appropriate compared to the target code volume. When this condition is reached, the quantization step Q revised at the step 19 is stored as the determined quantization step Q at step 18.

The step 7 of FIG. 1 may be performed on a first frame, and the quantization step Q stored at the step 18 is determined by the first frame. Or the step 7 may be performed on several frames, and from the quantization steps determined by these frames, an appropriate quantization step may be detected and stored at the step 18.

Figure 3:
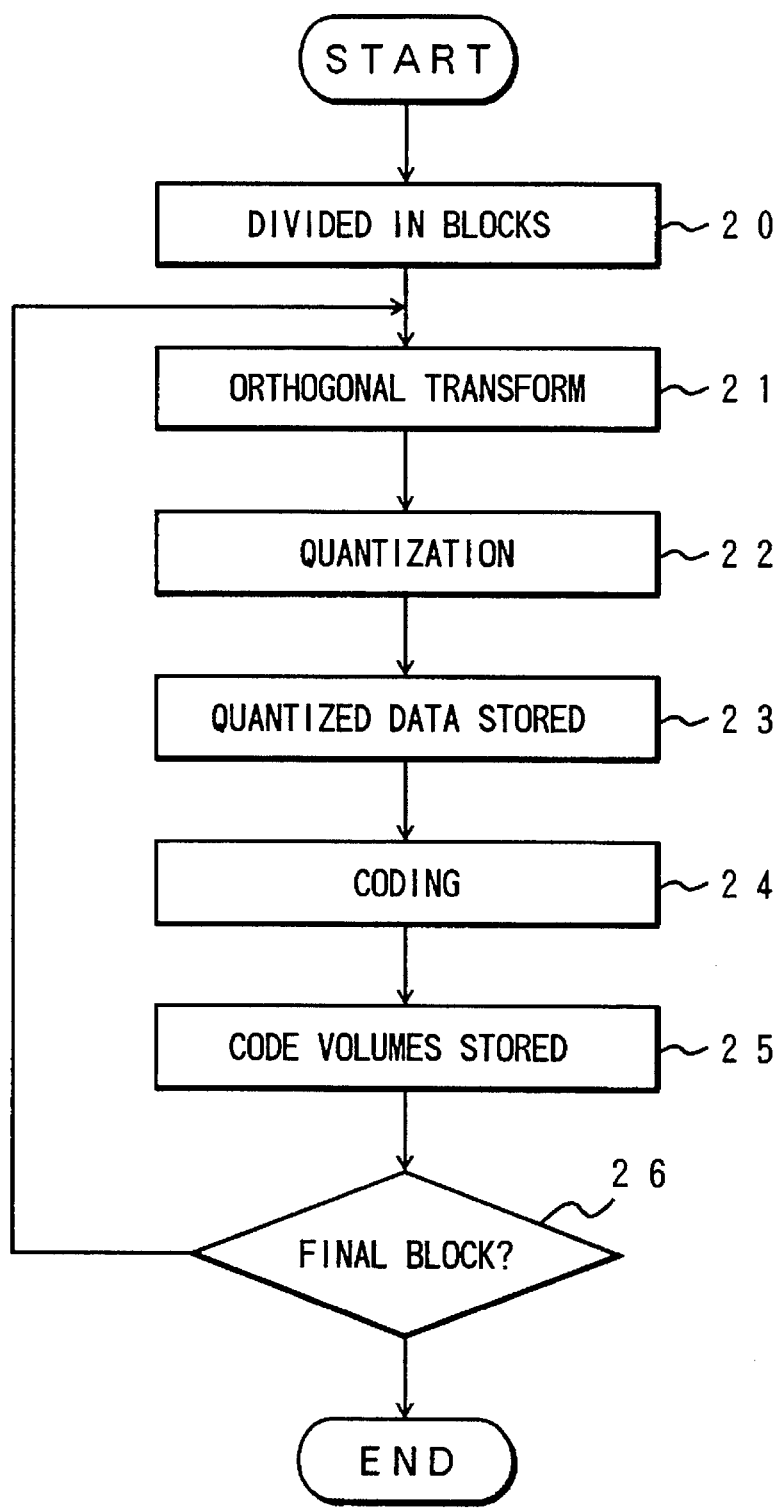
FIG. 3 shows a flow chart illustrating an embodiment of a first run of data-compression in the present invention.
Figure 5:
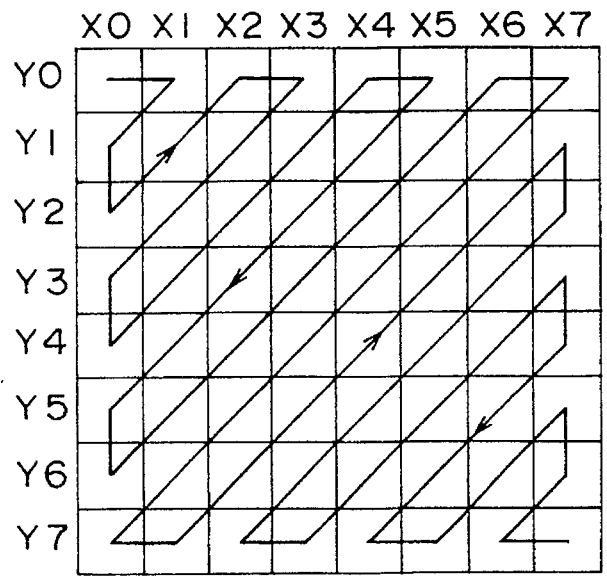
FIG. 5 shows a process of a zigzag scan used for scanning quantized coefficients of a block.

In FIG. 3, there is shown a flow chart illustrating the first run of data-compression (the step 8 of FIG. 1). Steps 20, 21, 22 of FIG. 3 are same with the steps 1, 2, 3 of FIG. 7, and will need no further explanation. In step 23, quantized data for each block are stored in a quantized data memory, for example, in a memory as shown by FIG. 5. Step 24 of FIG. 3 is same with the step 4 in FIG. 7.

Code volumes generated for each block at the coding (the step 24) are stored in a code volume memory at step 25. Steps 21, 22, 23, 24 and 25 are repeated for all blocks. At step 26, the block number is examined, and when the block number shows that the block is the final block of a frame, the step 8 of FIG. 1 is terminated.

Figure 4:
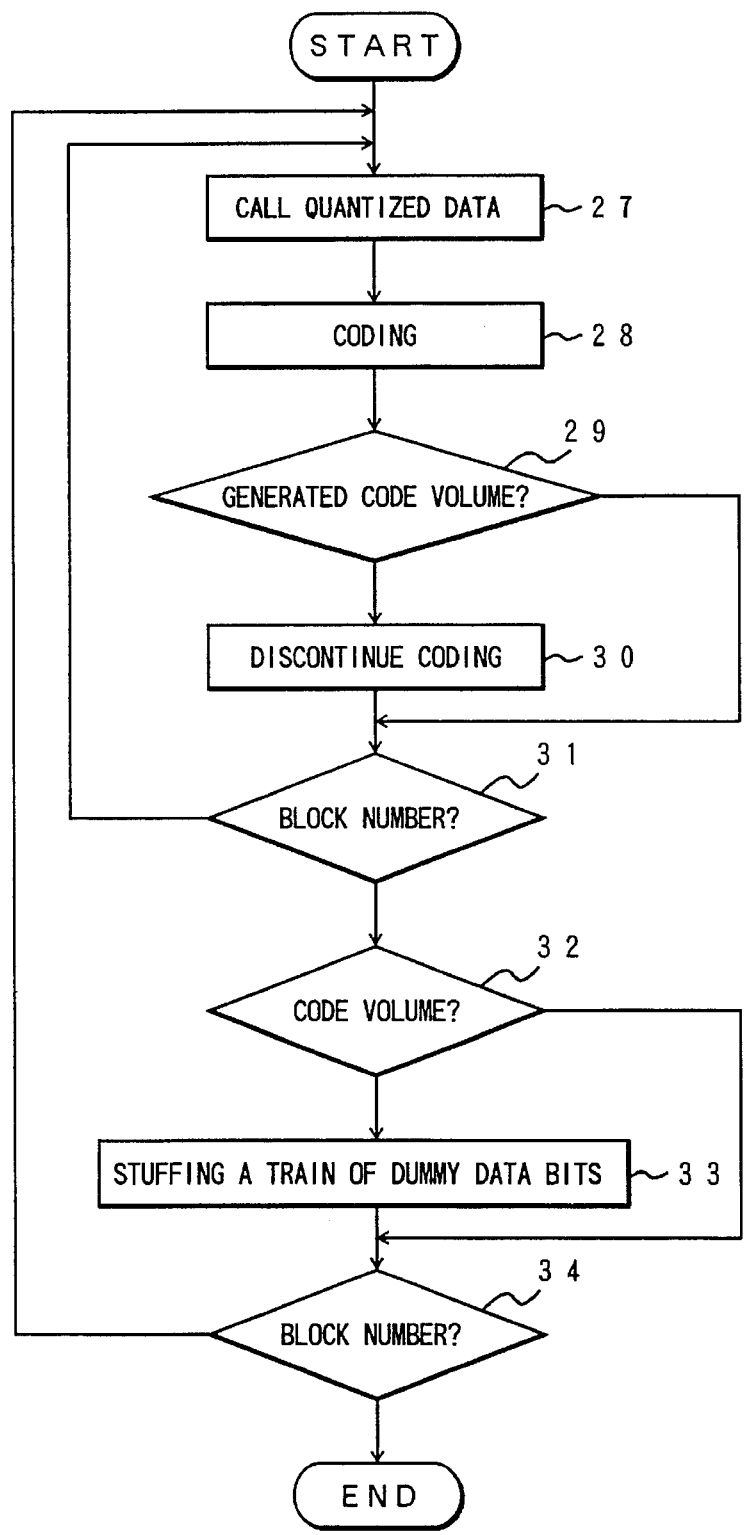
FIG. 4 shows a flow chart illustrating an embodiment of a second run of data-compression in the present invention.

In FIG. 4, there is shown a flow chart illustrating the second run of data-compression (the step 11 of FIG. 1).

At step 27, contents of the quantized data memory stored at the step 23 of FIG. 3 are read out on a working memory. Step 28 of FIG. 4 is same with the step 24 of FIG. 3. Code volumes generated at the step 28 are accumulated, and the accumulated code volume is compared, at step 29 to the allotted code volume (VAB) for the block determined at the step 10 of FIG. 1, and when the generated code volume (VGB) becomes equal to or larger than the value of (VAB), the coding (in the step 28) is discontinued at step 30.

In this discontinuation of coding (the step 30), only coefficients of higher frequency components are ignored, practically with no influence on fidelity because the coding is operated on the zigzag line shown in FIG. 5.

At step 31, the block number is examined, and when the block number shows that the block is not the last block of a macro-block, the steps 27–30 are repeated. When the block number shows that the block is the last block of a macro-block, the step goes to step 32, where total generated code volume of the macro-block is compared with the allotted code volume for the macro-block and when the total code volume generated of the macro-block is much smaller than the allotted code volume for the macro-block, a train of dummy bits is stuffed in the block to compensate the total code volume generated of the frame (step 33). There may be frames of a very small information, and generated code volumes of such frames must be compensated by stuffing of dummy bits.

At step 34, the block number is examined, and when the block number shows that the block is the final block of a frame, the step 11 of FIG. 1 is terminated.

In this way, when all the blocks of the frame are processed, an apparent value of the generated code volume of the frame will be at a level of the target code volume of a frame.

In this invention, as described in foregoing paragraphs, because the quantization step Q is maintained fixed for all frames of a moving picture, high speed data-compression and data-expansion are feasible.

Figure 6:
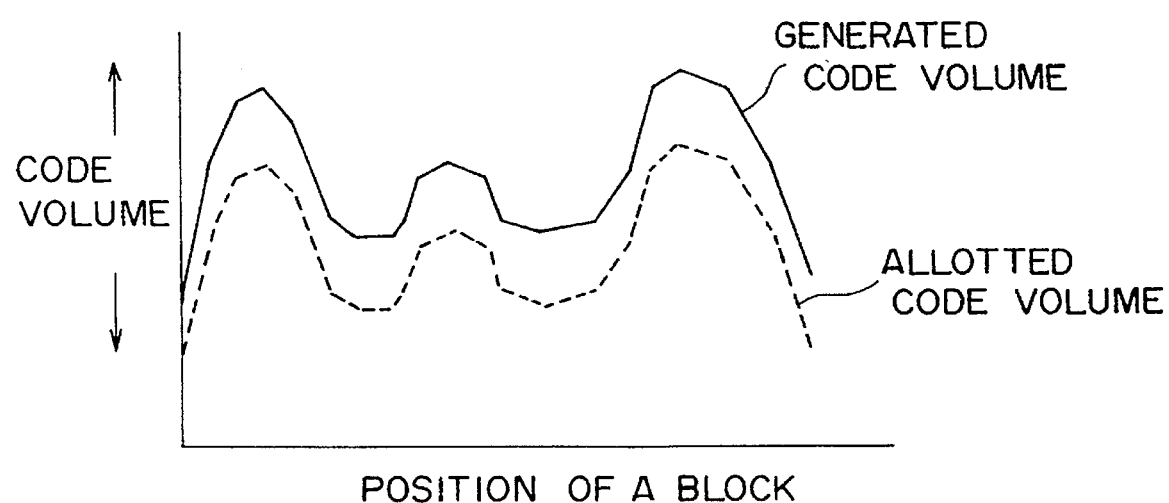
FIG. 6 shows a result of discontinuation of coding in this invention.

Because allotted code volume of a block is determined by the proportionate distribution equation (2), blocks of a larger information (larger generated code volume in FIG. 6) are allotted by a larger code volume (larger allotted code volume in FIG. 6), the fidelity of data-compressed picture is kept at a high level.

Because the target code volume of a frame is compensated by the generated code volume of a preceding frame, total code volume allowable for the data-compression is effectively used throughout the frames.

Because the quantized data obtained in the first run of data-compression is also used in the second run of data-compression, processing time is substantially decreased.

And because a frame of a very small information is stuffed by a train of dummy bits, all frames of a moving picture data are data-compressed to have a same level of generated code volume.

What is claimed is:

1. A method for restricting total code volume in a data-compression, wherein a frame of a moving picture is divided into blocks of a same size, pixel data of a block is transformed by two-dimensional orthogonal transform, coefficients of frequency components obtained by said transform are quantized, and the quantized coefficients are coded in a variable length coding; said method comprising:

a step for determining a quantization step by a first frame or by several frames;

a step of first run of data-compression wherein a frame of a picture is data-compressed, using said determined quantization step, recording generated code volume of each block, and calculating code volume generated by the frame;

a step of allotment of code volume wherein code volume allotted to a block, VAB, is determined from a target code volume of a frame, VTF, which represents a code volume allowable for a frame in said data compression, code volume generated by the block, VGB, and code volume generated by the frame, VGF, by an equation, VAB=VGB×VTF/VGF;

a step of second run of data-compression wherein contents of quantized data memory of a block which has been prepared and stored at said first run of data-compression is called and coded by said variable length coding, code volume generated by said coding is examined, and when said code volume generated becomes equal to or larger than said allotted code volume of said block, said coding of said block is discontinued.

2. A method for restricting total code volume in data-compression of claim 1, wherein said two-dimensional orthogonal transform is two-dimensional discrete cosine transform.

3. A method for restricting total code volume in data-compression of claim 1, wherein said variable length coding is Huffman coding.

4. A method for restricting total code volume in data-compression of claim 1, wherein said step for determining quantization step comprises a step for finding a quantization step which makes code volume generated from a first frame, an appropriate value compared to said target code volume, VTF.

5. A method for restricting total code volume in data-compression of claim 1, wherein said step for determining a quantization step comprises a step for finding a quantization step which makes average for a frame of code volumes generated from several frames, an appropriate value compared to said target code volume, VTF.

6. A method for restricting total code volume in data-compression of claim 1, wherein said step of allotment of code volume comprises a step of compensating said target code volume, VTF, by code volume generated in a preceding frame, wherein VAB=VGB×VTC/VGF where VTC=2×VTF−VGP and where VGP denotes a code volume generated by a preceding frame and VTC denotes a compensated target code volume.

7. A method for restricting total code volume in data-compression of claim 1, wherein said step of second run of data-compression comprises a step of stuffing dummy bits to a frame of a very small information, wherein the code volume generated by said frame is much smaller than said target code volume of a frame.

8. A method for restricting total code volume in data-compression of claim 7, wherein said step of stuffing dummy bits is performed on one or more predetermined blocks of said frame.

9. A method for restricting total code volume in a data-compression, wherein a frame of a moving picture is divided into blocks of a same size, pixel data of a block is transformed by two-dimensional orthogonal transform, coefficients of frequency components obtained by said transform are quantized, and the quantized coefficients are coded in a variable length coding; said method comprising:

a step for determining a quantization step by a first frame or by several frames;

a step of first run of data-compression wherein a frame of a picture is data-compressed, using said determined quantization step, recording generated code volume of each block, and calculating code volume generated by the frame;

a step of allotment of code volume wherein code volume allotted to a block is generated based upon a target code volume of a frame which represents a code volume allowable for a frame in said data-compression, code volume generated by the block, and code volume generated by the frame;

a step of second run of data-compression wherein contents of quantized data memory of a block which has been prepared and stored at said first run of data-compression is called and coded by said variable length coding, code volume generated by said coding is examined, and when said code volume generated becomes equal to or larger than said allotted code volume of said block, said coding of said block is discontinued.

\* \* \* \* \*